(12) United States Patent
Lee et al.

(10) Patent No.: US 11,383,577 B2
(45) Date of Patent: Jul. 12, 2022

(54) THERMAL MANAGEMENT SYSTEM FOR VEHICLE

(71) Applicants: Hyundai Motor Company, Seoul (KR); Kia Motors Corporation, Seoul (KR); DOOWON CLIMATE CONTROL CO., LTD., Asan-si (KR)

(72) Inventors: Sang Shin Lee, Suwon-si (KR); Jae Woong Kim, Hwaseong-si (KR); So La Chung, Seoul (KR); Man Ju Oh, Yongin-si (KR); Chul Min Kim, Asan-si (KR); Du Youl Choi, Asan-si (KR)

(73) Assignees: Hyundai Motor Company, Seoul (KR); Kia Motors Corporation, Seoul (KR); DOOWON CLIMATE CONTROL CO., LTD., Asan-si (KR)

( * ) Notice: Subject to any disclaimer, the term of this patent is extended or adjusted under 35 U.S.C. 154(b) by 385 days.

(21) Appl. No.: 16/676,889

(22) Filed: Nov. 7, 2019

(65) Prior Publication Data

US 2020/0391570 A1  Dec. 17, 2020

(30) Foreign Application Priority Data

Jun. 12, 2019  (KR) .......................... 10-2019-0069239

(51) Int. Cl.
*B60H 1/00* (2006.01)
*B60R 16/04* (2006.01)
*B60L 50/60* (2019.01)

(52) U.S. Cl.
CPC .......... *B60H 1/00278* (2013.01); *B60L 50/60* (2019.02); *B60R 16/04* (2013.01)

(58) Field of Classification Search
CPC ...... B60H 1/00278; B60L 50/60; B60R 16/04
USPC ........................................................ 165/202
See application file for complete search history.

(56) References Cited

U.S. PATENT DOCUMENTS

| 2020/0180390 A1* | 6/2020 | Kim .................. B60H 1/00921 |
| 2020/0180391 A1* | 6/2020 | Kim .................. B60H 1/32284 |
| 2020/0290426 A1* | 9/2020 | Aikawa ............. B60H 1/00428 |

FOREIGN PATENT DOCUMENTS

KR  10-1448656 B1  10/2014

* cited by examiner

*Primary Examiner* — Davis D Hwu
(74) *Attorney, Agent, or Firm* — Morgan, Lewis & Bockius LLP

(57) ABSTRACT

A thermal management system may include a battery line connected to a high-voltage battery core and having a first radiator, and through which cooling water flows by a first pump; an introduction line having an end connected to an upstream side of the first radiator and the other end connected to the internal air-conditioning heating core, and through which cooling water flows by a second pump; a discharge line having an end connected to an upstream side of the high-voltage battery core in the battery line and the other end connected to the internal air-conditioning heating core, and through which the cooling water introduced through the introduction line flows; a refrigerant line having an expansion valve, an internal air-conditioning cooling core, a compressor, and an air-cooling condenser and through which a refrigerant flows; and a water-cooling condenser connecting the refrigerant line and the introduction line.

16 Claims, 11 Drawing Sheets

THERMAL MANAGEMENT SYSTEM FOR VEHICLE

CROSS-REFERENCE TO RELATED APPLICATION

The present application claims priority to Korean Patent Application No. 10-2019-0069239, filed on Jun. 12, 2019 in the Korean Intellectual Property Office, the entire contents of which is incorporated herein for all purposes by this reference.

BACKGROUND OF THE INVENTION

Field of the Invention

The present invention relates to a thermal management system for a vehicle, the system efficiently managing energy required for internal air-conditioning, cooling of electric parts, or cooling/heating of a battery in the thermal management field for vehicles.

Description of Related Art

Recently, implementation of an eco-friendly technology and solution of problems such as energy exhaustion are arising as social issues in association with an electric vehicle. An electric vehicle is driven by a motor that outputs power by being supplied with electricity from a battery. Accordingly, an electric vehicle has advantages of not discharging carbon dioxide, generating little noise, and having a higher energy efficiency of a motor than the energy efficiency of an engine, so it has been spotlighted as an eco-friendly vehicle.

The core technology for achieving such an electric vehicle is the technology related to a battery module, and recently, studies for reducing the weight and size of a battery and decreasing the charge time have been actively conducted. A battery module can maintain optimal performance and a long lifespan when it is used in an optimal temperature environment. However, it is substantially difficult to use a battery module in an optimal temperature environment due to heat which is generated in operation and a change of external temperature.

Furthermore, an electric vehicle has no waste heat source which is generated by combustion in a specific engine such as an internal combustion engine, so that the interior of the electric vehicle is heated with an electric heating device in wintertime. Furthermore, warming-up is required to improve the charge and discharge performance of a battery in an intense cold period, so a separate heating-type electric heater is used. That is, a technology of operating a heating/cooling system for controlling the temperature of a battery module separately from a heating/cooling system for internal air-conditioning of a vehicle to maintain an optimal temperature environment for the battery module has been adopted. In other words, two independent heating/cooling systems are constructed, and one thereof is used for internal heating/cooling and the other one is used for controlling the temperature of a battery module.

However, the present operation method cannot efficiently manage energy, so that the vehicle traveling range is short, so long-distance driving is impossible. Furthermore, the traveling range decreases over 30% when cooling is performed in summer time and over 40% when heating is performed in wintertime, so that the problem with heating in wintertime that was not a problem in an internal combustion engine becomes severe. When a high-capacity PTC is mounted to solve the problem with heating in wintertime, there is a problem of reduction of the traveling range and excessive manufacturing cost and weight due to use of heat pump.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a thermal management system for a vehicle, the system efficiently managing energy required for internal air-conditioning, cooling of electric parts, or cooling/heating of a battery in the automotive thermal management field.

In view of an aspect, a thermal management system for a vehicle according to an exemplary embodiment of the present invention may include: a battery line which is connected to a high-voltage battery core and has a first radiator, and through which cooling water flows by a first pump; an introduction line that has an end portion connected to an upstream side of the first radiator in the battery line and has the other end portion connected to the internal air-conditioning heating core, and through which cooling water flows by a second pump; a discharge line that has an end portion connected to an upstream side of the high-voltage battery core in the battery line and has the other end portion connected to the internal air-conditioning heating core, and through which the cooling water introduced through the introduction line flows; a refrigerant line that has an expansion valve, the internal air-conditioning cooling core, a compressor, and an air-cooling condenser and through which a refrigerant flows; and a water-cooling condenser that connects the refrigerant line and the introduction line and is mounted so that the refrigerant at a downstream side of the compressor in the refrigerant line and the cooling water in the introduction line exchange heat with each other through water-cooling condenser.

The thermal management system may further include an electric part line which is connected to an electric part core and has a second radiator and through which cooling water flows by a third pump.

The thermal management system may further include: a first cooling water bypass line that has an end portion connected to an upstream side of the electric part core in the electric part line through a first valve and the other end portion connected to a downstream side of the electric part core in the electric part line; a second cooling water bypass line that has an end portion connected to an upstream side of the high-voltage battery core in the battery line through a second valve and the other end portion connected to a downstream side of the high-voltage battery core in the battery line; and a battery chiller which is mounted so that the cooling water in the first cooling water bypass line and the cooling water in the second cooling water bypass line exchange heat with each other.

The thermal management system may further include a first refrigerant bypass line that has an end portion connected to an upstream side of the expansion valve in the refrigerant line and the other end portion connected to a downstream side of the internal air-conditioning cooling core in the refrigerant line, in which the first refrigerant bypass line is connected to the battery chiller, so that a refrigerant in the first refrigerant bypass line exchanges heat with cooling water in the first cooling water bypass line or cooling water in the second cooling water bypass line.

In a first mode in which the high-voltage battery core is cooled using external air outside the vehicle and cooled air is discharged to an interior of the vehicle, the controller may be configured to control the compressor, the second valve, the first pump, and the second pump so that a refrigerant circulates through the refrigerant line and cooling water that has passed through the high-voltage battery core is introduced into the high-voltage battery core after passing through the first radiator.

In a second mode in which the high-voltage battery core and the electric part core are cooled using external air outside the vehicle and cooled air is discharged to the interior of the vehicle, the controller may be configured to control the compressor, the first valve, the second valve, the first pump, the second pump, and the third pump so that a refrigerant circulates through the refrigerant line, cooling water that has passed through the high-voltage battery core is introduced into the high-voltage battery core after passing through the first radiator, and cooling water that has passed through the electric part core is introduced into the electric part core after passing through the second radiator.

The thermal management system may further include a third cooling water bypass line that has an end portion connected to a downstream side of the high-voltage battery core in the battery line through a third valve and the other end portion connected to the discharge line.

In a third mode in which the high-voltage battery core is cooled using the battery chiller, the electric part core is cooled using external air outside the vehicle, and cooled air is discharged to the interior of the vehicle, the controller may be configured to control the compressor, the first valve, the second valve, the third valve, the first pump, the second pump, and the third pump so that a refrigerant circulates through the refrigerant line and the first refrigerant bypass line, cooling water that has passed through the high-voltage battery core is introduced into the high-voltage battery core after passing through the first cooling water bypass line, the cooling water that has passed through the first radiator is introduced into the first radiator after passing through the introduction line, the discharge line, and the second cooling water bypass line, and cooling water that has passed through the electric part core is introduced into the electric part core after passing through the second radiator.

In a fourth mode in which the electric part core is cooled using external air outside the vehicle and cooled air is discharged to the interior of the vehicle, the controller may be configured to control the compressor, the first valve, the second valve, the third valve, the second pump, and the third pump so that a refrigerant circulates through the refrigerant line, cooling water that has passed through the electric part core is introduced into the electric part core after passing through the second radiator, and cooling water that has passed through the first radiator is introduced into the first radiator after passing through the introduction line, the discharge line, and the third cooling water bypass line.

In a fifth mode in which the high-voltage battery core is cooled using the battery chiller and the electric part core is cooled using external air outside the vehicle, the controller may be configured to control the compressor, the first valve, the second valve, the third valve, the first pump, the second pump, and the third pump so that a refrigerant circulates through a portion of the refrigerant line and the first refrigerant bypass line, cooling water that has passed through the high-voltage battery core is introduced into the high-voltage battery core after passing through the first cooling water bypass line, and cooling water that has passed through the electric part core is introduced into the electric part core after passing through the second radiator.

The thermal management system may further include a fourth cooling water bypass line that has an end portion connected to an upstream side of the first radiator in the battery line through a fourth valve and the other end portion connected to a downstream side of the first radiator in the battery line.

In a sixth mode in which the electric part core and the high-voltage battery core are cooled using the battery chiller and air with increased temperature is discharged to the interior of the vehicle, the controller may be configured to control the compressor, the first valve, the second valve, the third valve, the fourth valve, the first pump, the second pump, and the third pump so that a refrigerant circulates through a portion of the refrigerant line and the first refrigerant bypass line, cooling water that has passed through the electric part core is introduced into the electric part core after passing through the first cooling water bypass line, cooling water that has passed through the high-voltage battery core is introduced into the high-voltage battery core after passing through the second cooling water bypass line, and cooling water circulates through the introduction line, the discharge line, the third cooling water bypass line, and the fourth cooling water bypass line.

In a seventh mode in which the high-voltage battery core is increased in temperature using the water-cooling condenser and air with increased temperature is discharged to the interior of the vehicle, the controller may be configured to control the compressor, the first valve, the second valve, the third valve, the fourth valve, the first pump, the second pump, and the third pump so that a refrigerant can circulate through a portion of the refrigerant line and the first refrigerant bypass line, cooling water that has passed through the high-voltage battery core is introduced into the high-voltage battery core after passing through the fourth cooling water bypass line, the introduction line, and the discharge line, and cooling water that has passed through the electric part core is introduced into the electric part core after passing through the first cooling water bypass line.

The thermal management system may further include a fifth cooling water bypass line that has an end portion connected to an upstream side of the water-cooling condenser in the battery line through a fifth valve and the other end portion connected to a downstream side of the water-cooling condenser.

The thermal management system may further include a second refrigerant bypass line that has an end portion connected to an upstream side of the water-cooling condenser in the refrigerant line and the other end portion connected to a downstream side of the water-cooling condenser through a sixth valve.

According to the thermal management system for a vehicle of the present invention, it is possible to efficiently manage energy required for internal air-conditioning, cooling of electric parts, or cooling/heating of a battery in the automotive thermal management field.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
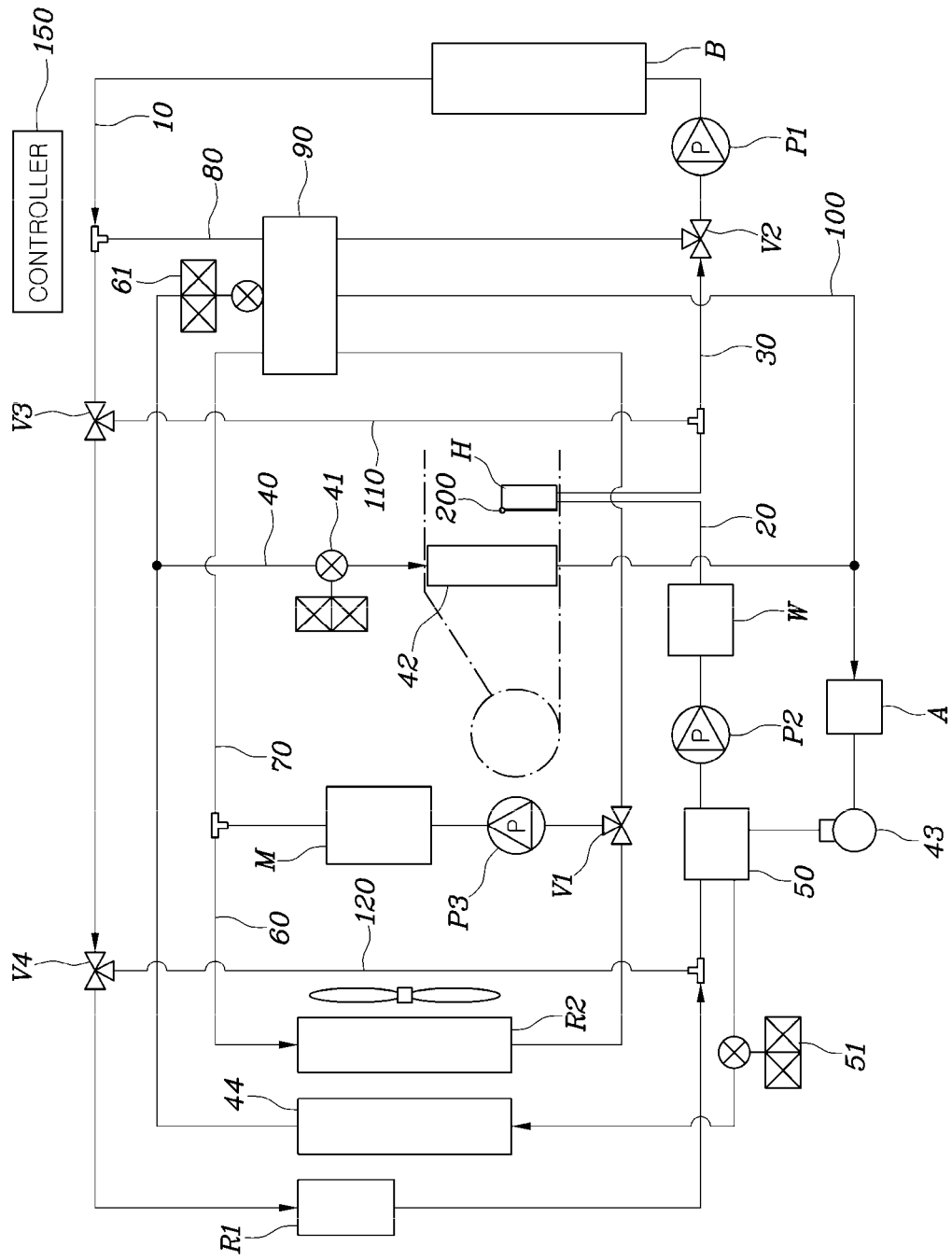
FIG. 1 is a view showing a thermal management system for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 8:
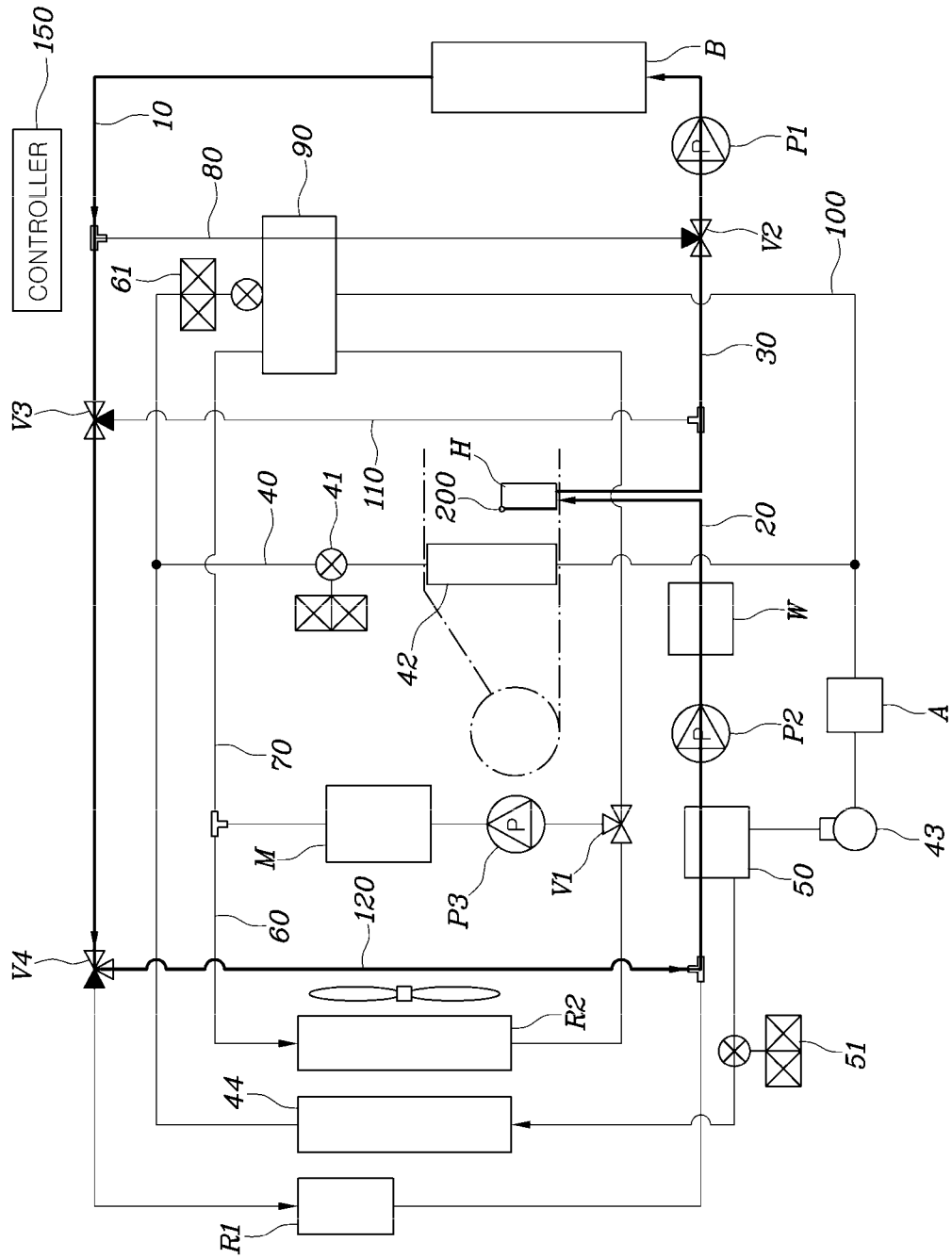
Figure 9:
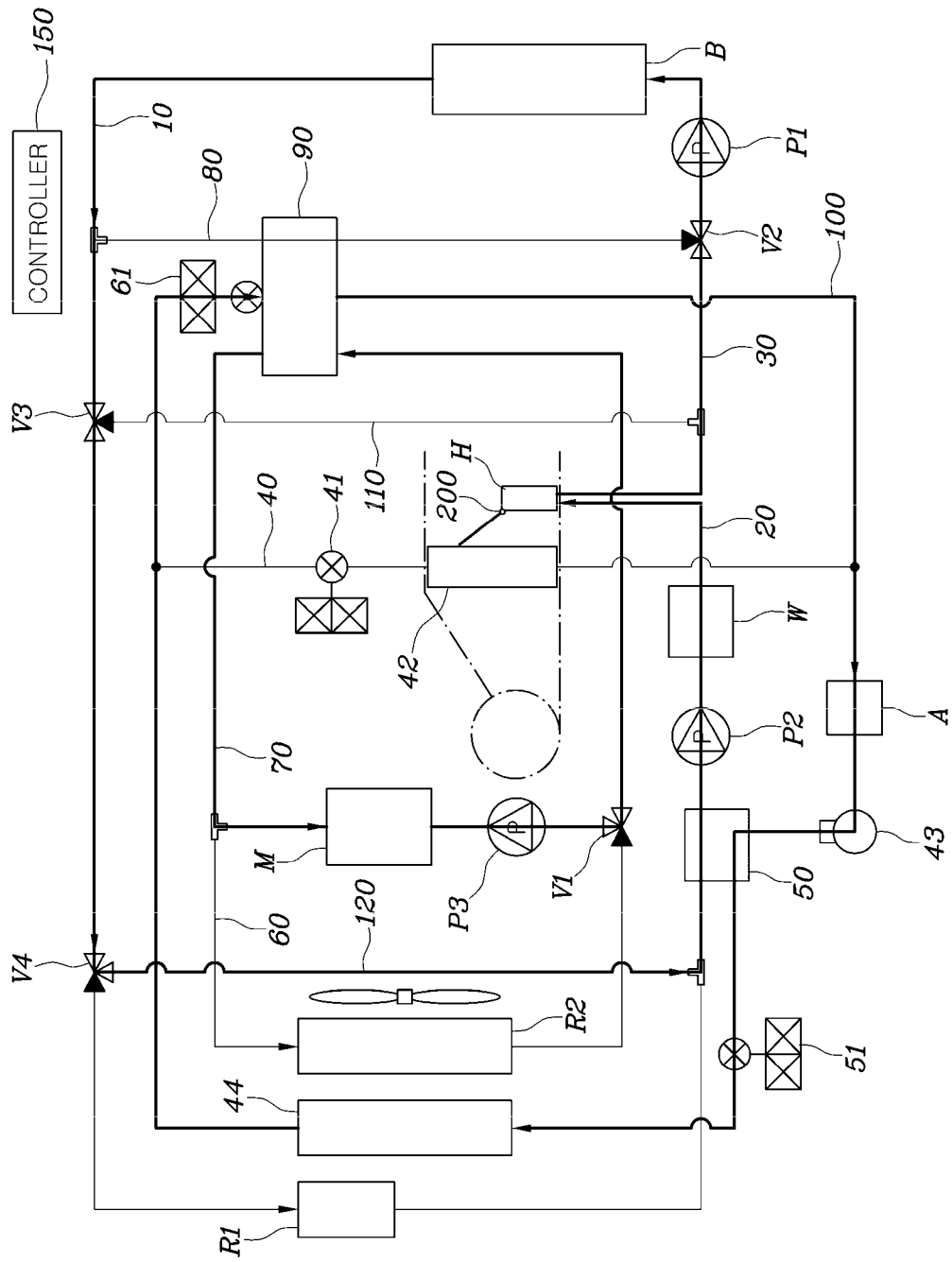
Figure 10:
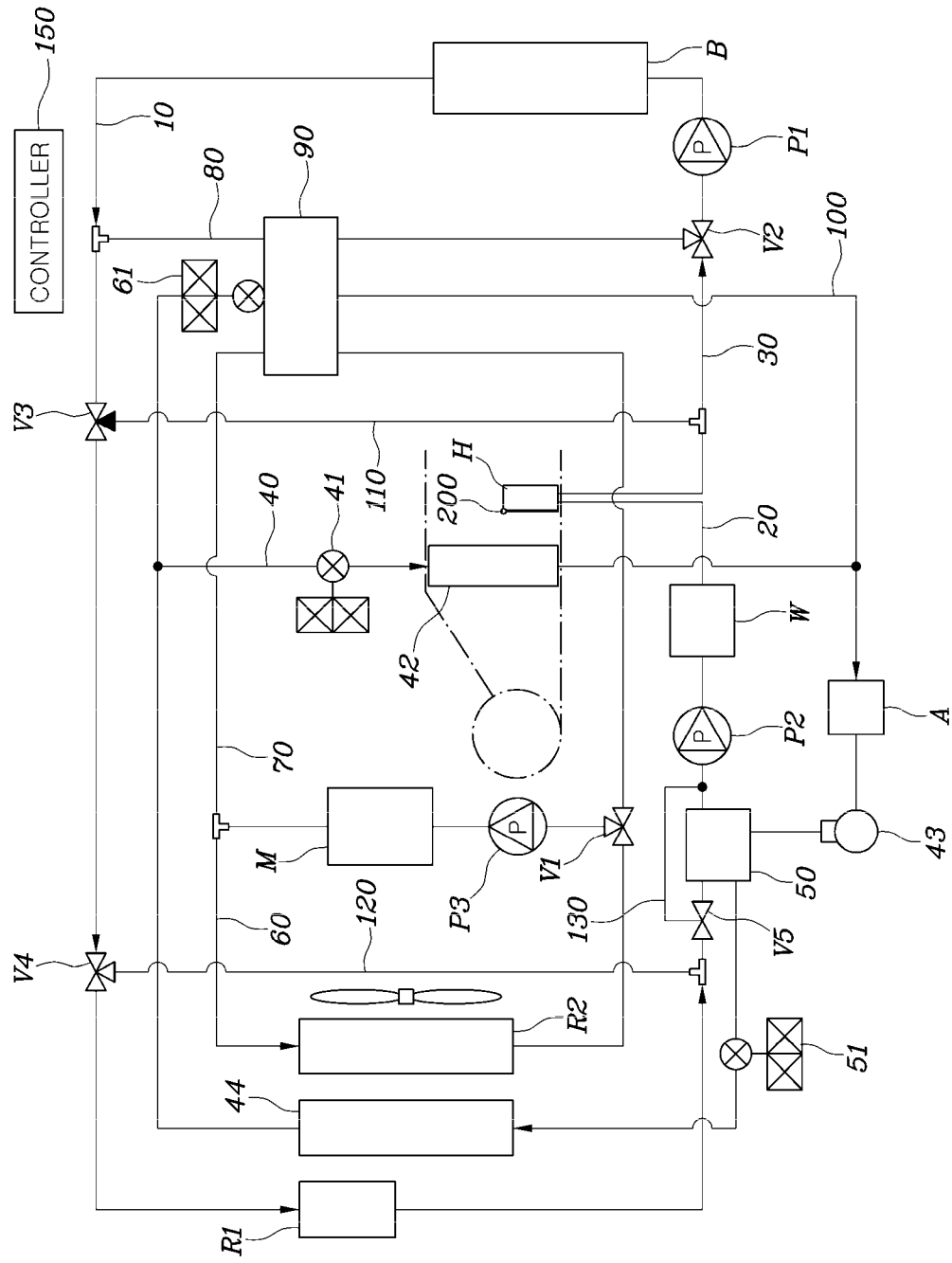
FIG. 10 and FIG. 11 are views illustrating a thermal management system for a vehicle according to various exemplary embodiments of the present invention.
Figure 11:
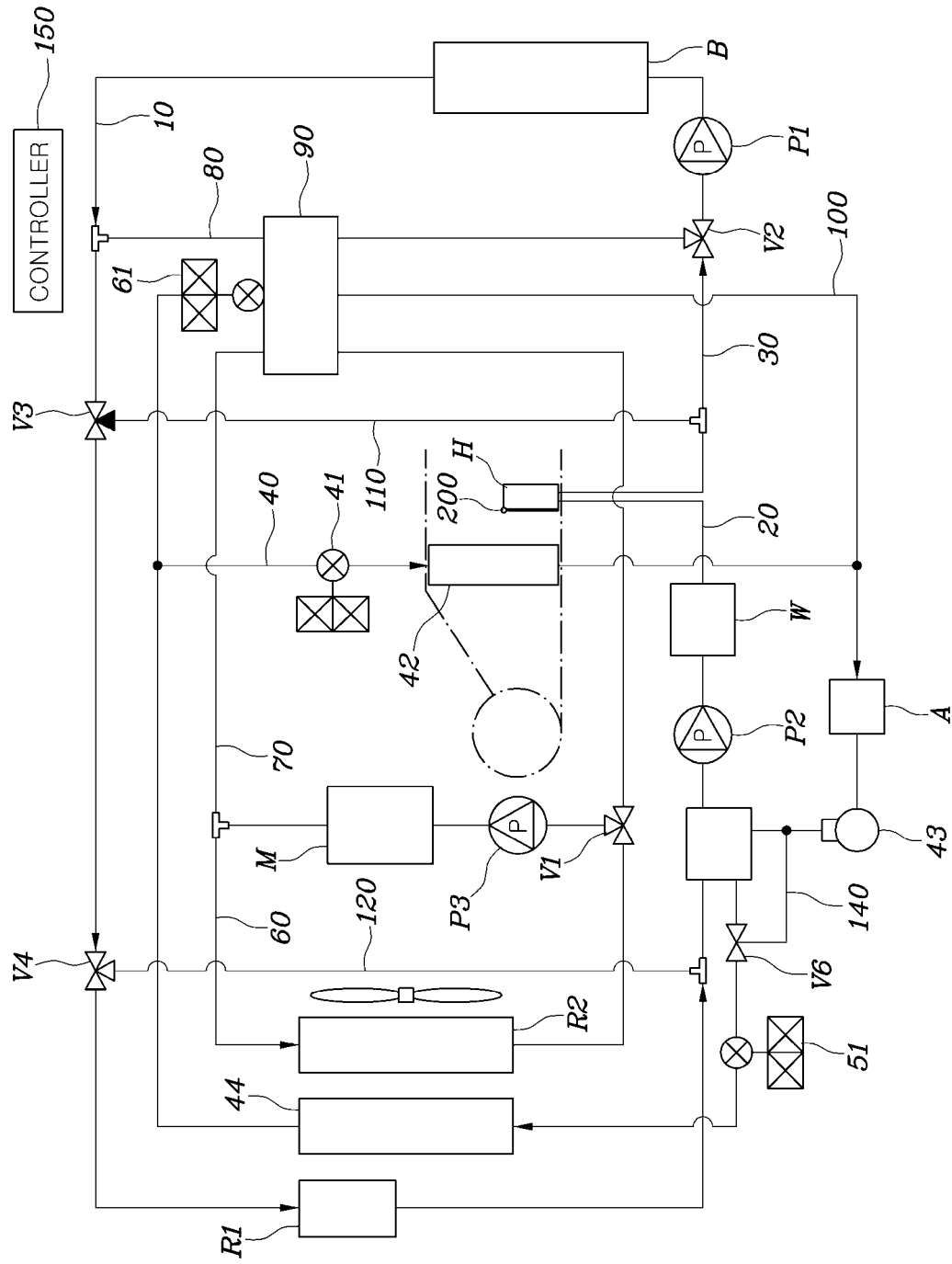

FIG. 1 is a view showing a thermal management system for a vehicle according to an exemplary embodiment of the present invention, FIG. 2, FIG. 3, FIG. 4, FIG. 5, FIG. 6, FIG. 7, FIG. 8, and FIG. 9 are views showing circulation of cooling water and a refrigerant in a thermal management system for a vehicle according to an exemplary embodiment of the present invention, and FIG. 10 and FIG. 11 are views illustrating a thermal management system for a vehicle according to various exemplary embodiments of the present invention.

A controller 150 is provided in an exemplary embodiment of the present invention. The controller 150 according to an exemplary embodiment of the present invention may be implemented through a nonvolatile memory configured to store algorithms for controlling operation of various components of a vehicle or data about software commands for executing the algorithms, and a processor configured to perform operation to be described below using the data stored in the memory. The memory and the processor may be individual chips. Alternatively, the memory and the processor may be integrated in a single chip. The processor may be implemented as one or more processors.

The controller 150 controls operations of a first pump P1, a second pump P2, and a third pump P3, controlling the flow of cooling water in cooling water lines in which the pumps are respectively mounted. Furthermore, the controller 150 controls the operation of a compressor 43 in a refrigerant line 40, controlling the flow of a refrigerant in the refrigerant line 40. A first valve V1, a second valve V2, a third valve V3, a fourth valve V4, a fifth valve V5, and a sixth valve V6 are controlled by the controller 150, selectively connecting cooling water lines to which the valves are respectively connected, or controlling a flow rate. The valves are multi-way valves. The controller 150 controls whether to introduce air to an internal air-conditioning heating core H by controlling a door 200. Accordingly, when it is required to introduce air to the internal air-conditioning heating core H, the controller 150 can open the internal air-conditioning heating core by controlling the door 200. Accordingly, when it is not required to introduce air to the internal air-conditioning heating core H, the controller 150 can close the internal air-conditioning heating core by controlling the door 200.

As shown in FIG. 1, the thermal management system for a vehicle according to an exemplary embodiment of the present invention includes: a battery line 10 which is connected to a high-voltage battery core B and has a first radiator R1, and through which cooling water flows by a first pump P1; an introduction line 20 that has an end portion connected to an upstream side of the first radiator R1 in the battery line 10 and has the other end portion connected to the internal air-conditioning heating core H and through which cooling water flows by a second pump P2; a discharge line 30 that has an end portion connected to an upstream side of the high-voltage battery core B in the battery line 10 and has the other end portion connected to the internal air-conditioning heating core H and through which the cooling water introduced through the introduction line 20 flows; a refrigerant line 40 that has an expansion valve 41, an internal air-conditioning cooling core 42, a compressor 43, an accumulator A and an air-cooling condenser 44 and through which a refrigerant flows; and a water-cooling condenser 50 that connects the refrigerant line 40 and the introduction line 20 and is mounted so that the refrigerant at a downstream side of the compressor 43 in the refrigerant line 40 and the cooling water in the introduction line 20 exchange heat with each other.

The battery line 10 is provided in an exemplary embodiment of the present invention. The battery line 10 is connected to the high-voltage battery core B. The first radiator R1 is mounted in the battery line 10 and cooling water can flow through the battery line 10 by the first pump P1. In more detail, in the battery line 10, the high-voltage battery core B is mounted and the first radiator R1 for cooling the high-voltage battery core B using external air is mounted. Furthermore, the first pump P1 which is controlled to operate and stop by the controller 150 and circulates cooling water is mounted in the battery line 10. The high-voltage battery core B may be a concept including both of a heat dissipation unit directly connected to a high-voltage battery or a heat dissipation unit indirectly connected to a high-voltage battery through a separate cooling water line. Cooling water that has exchanged heat with external air through the first radiator R1 is introduced into the high-voltage battery core B, whereby the high-voltage battery core B may be cooled.

The introduction line 20 and the discharge line 30 are provided in an exemplary embodiment of the present invention. The introduction line 20 has an end portion connected to an upstream side of the first radiator R1 in the battery line 10 and the other end portion connected to the internal air-conditioning heating core H. The second pump P2 which is controlled to operate and stop by the controller 150 and circulates cooling water is mounted in the introduction line

20. The discharge line 30 has an end portion connected to an upstream side of the high-voltage battery core B in the battery line 10 and the other end portion connected to the internal air-conditioning heating core H. Accordingly, since the discharge line 30 is connected to the internal air-conditioning heating core H, cooling water introduced through the introduction line 20 may be introduced. Accordingly, the cooling water introduced into the introduction line 20 from the battery line 10 may be discharged back to the battery line 10 through the discharge line 30. On the other hand, as shown in the figures, a water heater W is provided in an exemplary embodiment of the present invention. Accordingly, when cooling water heated through the water heater W flows through the internal air-conditioning heating core H, the air flowing through the internal air-conditioning heating core H increases in temperature, so air with temperature increased may be discharged to the interior of a vehicle.

The refrigerant line 40 is provided in an exemplary embodiment of the present invention. The expansion valve 41, the internal air-conditioning cooling core 42, the compressor 43, and the air-cooling condenser 44 are mounted in the refrigerant line 40. The air-cooling condenser 44 for removing heat of the refrigerant in the refrigerant line 40 using external air outside the vehicle is mounted in the refrigerant line 40. A refrigerant is circulated by the compressor 43 which is operated in the refrigerant line 40 of the vehicle by the controller 150. The refrigerant exchanges heat with the air flowing through the internal air-conditioning cooling core 42, so that the air flowing through the internal air-conditioning cooling core 42 is cooled. Accordingly, cooled air may be discharged to the interior of the vehicle.

Furthermore, water-cooling condenser 50 is provided in an exemplary embodiment of the present invention. The water-cooling condenser 50 is mounted so that the refrigerant at a downstream side of the compressor 43 in the refrigerant line 40 and the cooling water in the introduction line 20 exchange heat with each other. Accordingly, the refrigerant line 40 and the introduction line 20 are thermally connected through the water-cooling condenser 50. That is, the refrigerant increased in temperature through the compressor 43 in the refrigerant line 40 and the cooling water in the introduction line 20 can exchange heat with each other through the water-cooling condenser 50. Therefore, the refrigerant in the refrigerant line 40 can increase the temperature of the cooling water in the introduction line 20.

On the other hand, as shown in FIG. 1, an electric part line 60 is provided in an exemplary embodiment of the present invention. The electric part line 60 is connected to an electric part core M and has a second radiator R2, and cooling water can flow through the electric part line 60 by a third pump P3. In detail, the electric part core M may be a concept including both of a heat dissipation unit directly connected to an electric device and a heat dissipation unit indirectly connected to an electric device through a separate cooling water line. Cooling water can flow through the electric part line 60 by the third pump P3 which is controlled to operate and stop by the controller 150. The second radiator R2 is mounted in the electric part line 60 and cooling water can flow through the electric part line 60 by the third pump P3 which is controlled to operate and stop. Since the second radiator R2 is mounted in the electric part line 60, the cooling water can exchange heat with external air outside the vehicle through the second radiator R2. Accordingly, the second radiator R2 is connected to the electric part core M through the electric part line 60 to exchange heat.

The thermal management system for a vehicle according to an exemplary embodiment of the present invention, as shown in FIG. 1, may further include: a first cooling water bypass line 70 that has an end portion connected to an upstream side of the electric part core M in the electric part line 60 through the first valve V1 and the other end portion connected to a downstream side of the electric part core M in the electric part line 60; a second cooling water bypass line 80 that has an end portion connected to an upstream side of the high-voltage battery core B in the battery line 10 through the second valve V2 and the other end portion connected to a downstream side of the high-voltage battery core B in the battery line 10; and a battery chiller 90 which is mounted so that the cooling water in the first cooling water bypass line 70 and the cooling water in the second cooling water bypass line 80 exchange heat with each other.

In detail, the first cooling water bypass line 70 has an end portion connected to an upstream side of the electric part core M in the electric part line 60 through the first valve V1 and the other end portion connected to a downstream side of the electric part core M in the electric part line 60. In detail, the second cooling water bypass line 80 has an end portion connected to an upstream side of the high-voltage battery core B in the battery line 10 through the second valve V2 and the other end portion connected to a downstream side of the high-voltage battery core B in the battery line 10. As shown in the figures, the first cooling water bypass line 70 and the second cooling water bypass line 80 are connected through the battery chiller 90 so that the cooling water in the first cooling water bypass line 70 and the cooling water in the second cooling water bypass line 80 exchange heat with each other. That is, since the first cooling water bypass line 70 and the second cooling water bypass line 80 are connected through the battery chiller 90, the cooling water flowing through the first cooling water bypass line 70 and the cooling water flowing through the second cooling water bypass line 80 are thermally connected.

Meanwhile, as shown in FIG. 1, the thermal management system for a vehicle according to an exemplary embodiment of the present invention further includes a first refrigerant bypass line 100 that has an end portion connected to an upstream side of the expansion valve 41 in the refrigerant line 40 and the other end portion connected to a downstream side of the internal air-conditioning cooling core 42 in the refrigerant line 40. The first refrigerant bypass line 100 is connected to the battery chiller 90, so that the refrigerant in the first refrigerant bypass line 100 can exchange heat with the cooling water in the first cooling water bypass line 70 or the cooling water in the second cooling water bypass line 80.

In an exemplary embodiment of the present invention, an expansion valve 51 is mounted between the air-cooling condenser 44 and the water cooling condenser 50 on the refrigerant line 40.

In an exemplary embodiment of the present invention, an expansion valve 61 is mounted between the air-cooling condenser 44 and the battery chiller 90 on the first refrigerant bypass line 100.

Referring to FIG. 1, the first refrigerant bypass line 100 has an end portion connected to an upstream side of the expansion valve 41 in the refrigerant line 40 and the other end portion connected to a downstream side of the internal air-conditioning cooling core 42 in the refrigerant line 40. Since the first refrigerant bypass line 100 is connected to the battery chiller 90, the refrigerant in the first refrigerant bypass line 100 can exchange heat with the cooling water in the first cooling water bypass line 70 or the cooling water in the second cooling water bypass line 80. Accordingly, the first refrigerant bypass line 100, the first cooling water bypass line 70, and the second cooling water bypass line 80 are thermally connected.

According to the thermal management system for a vehicle of the present invention, in a first mode in which the high-voltage battery core B is cooled using external air outside the vehicle and cooled air is discharged to the interior of the vehicle, the controller 150 controls the compressor 43, the second valve V2, the first pump P1, and the second pump P2 so that a refrigerant can circulate through the refrigerant line 40 and the cooling water that has passed through the high-voltage battery core B may be introduced into the high-voltage battery core B after passing through the first radiator R1.

Figure 2:
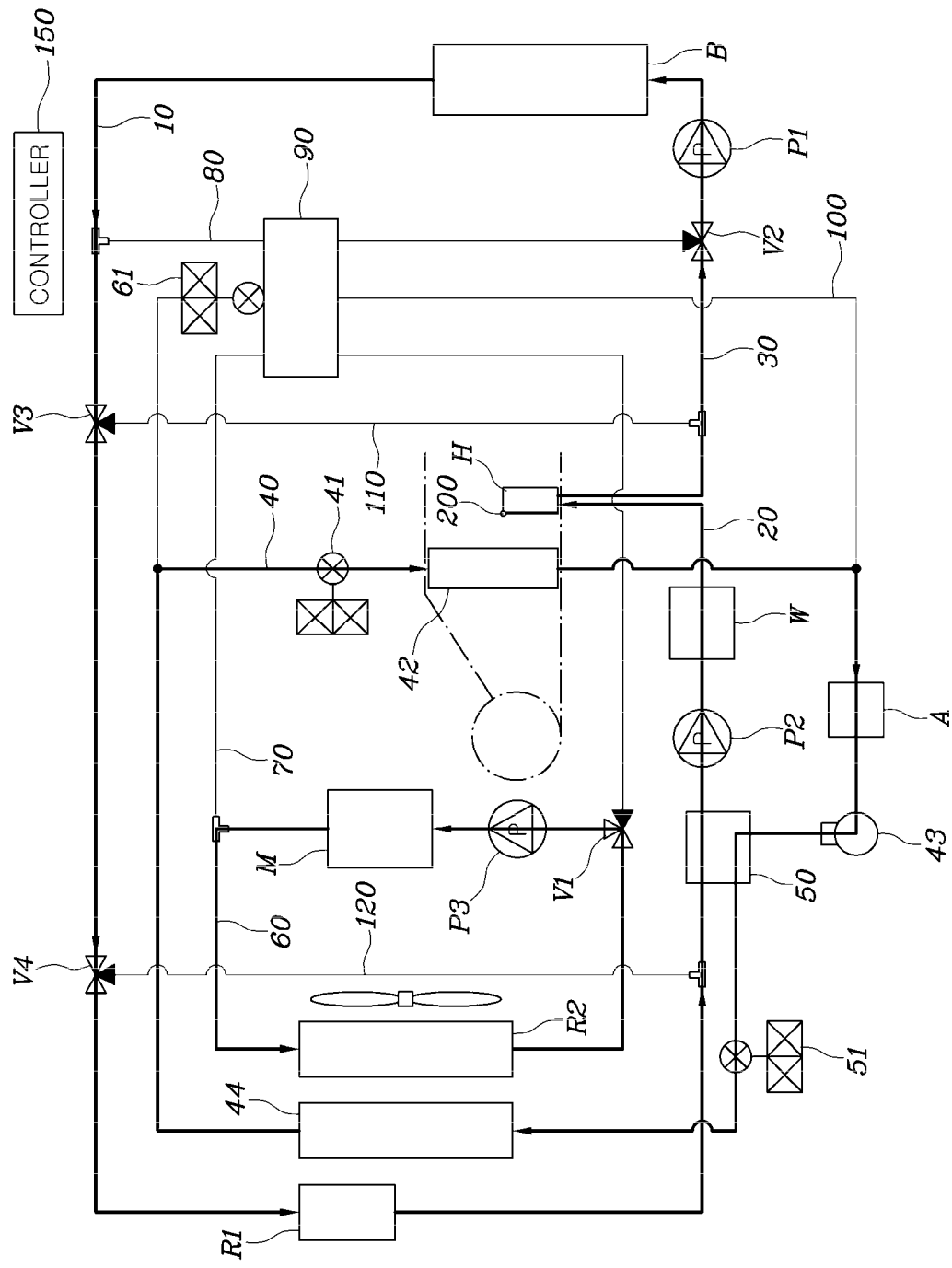
FIG. 2, FIG. 3, FIG. 4, FIG. 5, FIG. 6, FIG. 7, FIG. 8, and FIG. 9 are views showing circulation of cooling water and a refrigerant in a thermal management system for a vehicle according to an exemplary embodiment of the present invention.

The controller 150 controls the compressor 43, the second valve V2, the first pump P1, and the second pump P2. Referring to FIG. 2, the controller 150 controls the compressor 43 so that a refrigerant circulates through the refrigerant line 40. Furthermore, the controller 150 controls the second valve V2, the first pump P1, and the second pump P2 so that cooling water circulates through the battery line 10, the introduction line 20, and the discharge line 30. Accordingly, the cooling water that has passed through the high-voltage battery core B is introduced back into the high-voltage battery core B after passing through the first radiator R1. Therefore, the air passing through the internal air-conditioning cooling core 42 is cooled by exchanging heat with the refrigerant in the refrigerant line 40 and is then discharged to the interior of the vehicle. Furthermore, the cooling water that has been cooled by exchanging heat with external air outside the vehicle through the first radiator R1 is introduced into the high-voltage battery core B, so that the high-voltage battery core B is cooled.

According to the thermal management system for a vehicle of the present invention, in a second mode in which the high-voltage battery core B and the electric part core M are cooled using external air outside the vehicle and cooled air is discharged to the interior of the vehicle, the controller 150 controls the compressor 43, the first valve V1, the second valve V2, the first pump P1, the second pump P2, and the third pump P3 so that a refrigerant can circulate through the refrigerant line 40, the cooling water that has passed through the high-voltage battery core B may be introduced into the high-voltage battery core B after passing through the first radiator R1, and the cooling water that has passed through the electric part core M may be introduced into the electric part core M after passing through the second radiator R2.

The controller 150 controls the compressor 43, the first valve V1, the second valve V2, the first pump P1, the second pump P2, and the third pump P3. Referring to FIG. 2, the controller 150 controls the compressor 43 so that a refrigerant circulates through the refrigerant line 40. Furthermore, the controller 150 controls the second valve V2, the first pump P1, and the second pump P2 so that cooling water circulates through the battery line 10, the introduction line 20, and the discharge line 30. Accordingly, the cooling water that has passed through the high-voltage battery core B is introduced back into the high-voltage battery core B after passing through the first radiator R1. Therefore, the air passing through the internal air-conditioning cooling core 42 is cooled by exchanging heat with the refrigerant in the refrigerant line 40 and is then discharged to the interior of the vehicle. Furthermore, the cooling water that has been cooled by exchanging heat with external air outside the vehicle through the first radiator R1 is introduced to the high-voltage battery core B, so that the high-voltage battery core B is cooled.

Furthermore, the controller 150 controls the third pump P3, whereby cooling water circulates through the electric part line 60. Accordingly, the cooling water that has been cooled by exchanging heat with external air outside the vehicle through the second radiator R2 is introduced into the electric part core M, so that the electric part core M is cooled.

Meanwhile, the thermal management system for a vehicle according to an exemplary embodiment of the present invention, as shown in FIG. 1, may further include a third cooling water bypass line 110 that has an end portion connected to a downstream side of the high-voltage battery core B in the battery line 10 through the third valve V3 and the other end portion connected to the discharge line 30.

The third cooling water bypass line 110 has an end portion connected to a downstream side of the high-voltage battery core B in the battery line 10 through the third valve V3 and the other end portion connected to the discharge line 30. Accordingly, the controller 150 controls the second valve V2 and the third valve V3 so that the cooling water in the discharge line may be introduced into the high-voltage battery core B or may not be introduced into the high-voltage battery core B by the third cooling water bypass line 110.

According to the thermal management system for a vehicle of the present invention, in a third mode in which the high-voltage battery core B is cooled using the battery chiller 90, the electric part core M is cooled using external air outside the vehicle, and cooled air is discharged to the interior of the vehicle, the controller 150 controls the compressor 43, the first valve V1, the second valve V2, the third valve V3, the first pump P1, the second pump P2, and the third pump P3 so that a refrigerant can circulate through the refrigerant line 40 and the first refrigerant bypass line 100, the cooling water that has passed through the high-voltage battery core B may be introduced into the high-voltage battery core B after passing through the first cooling water bypass line 70, the cooling water that has passed through the first radiator R1 may be introduced into the first radiator R1 after passing through the introduction line 20, the discharge line 30, and the second cooling water bypass line 80, and the cooling water that has passed through the electric part core M may be introduced into the electric part core M after passing through the second radiator R2.

Figure 3:
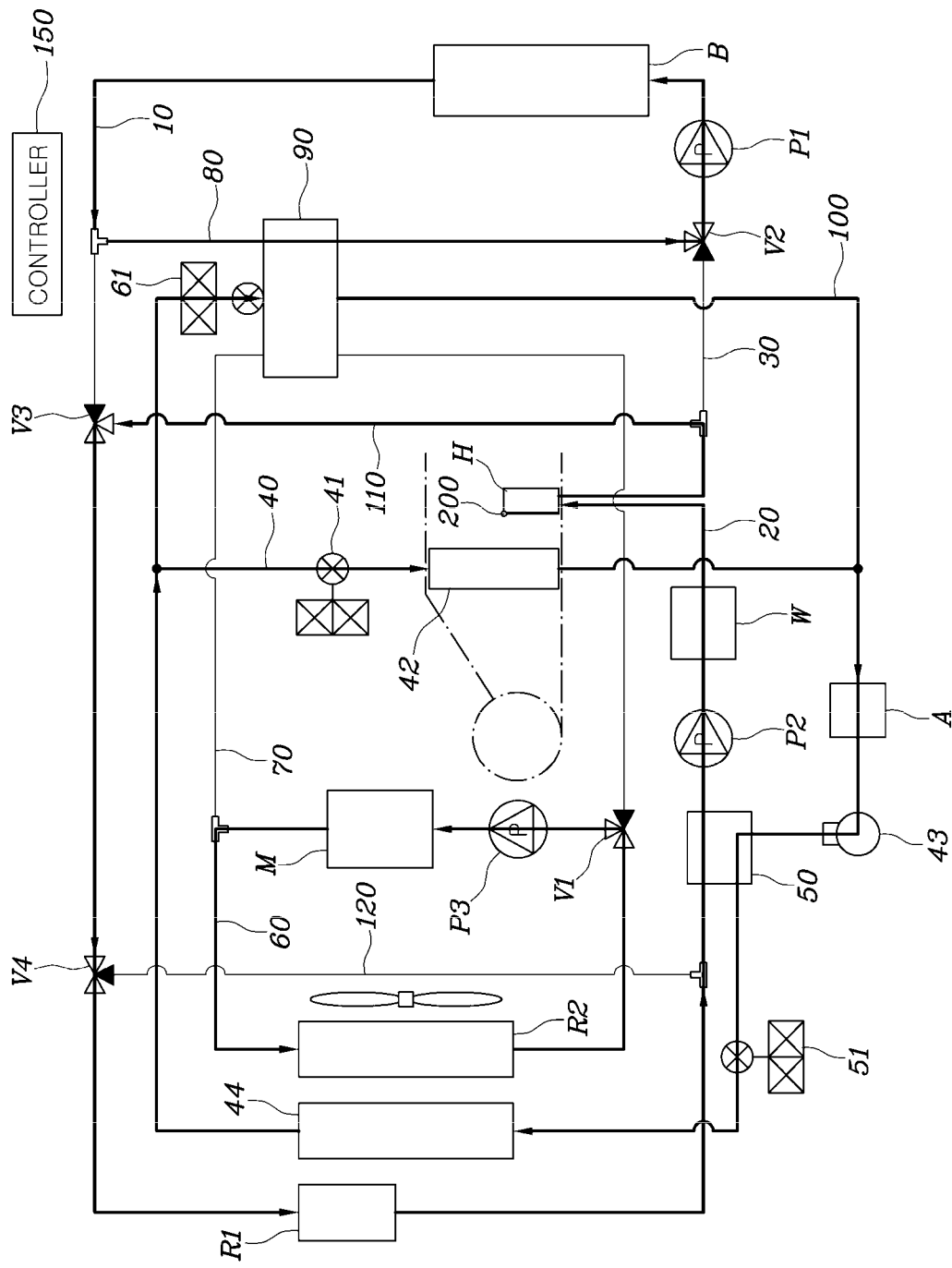

Referring to FIG. 3, the controller 150 controls the compressor 43, the first valve V1, the second valve V2, the third valve V3, the first pump P1, the second pump P2, and the third pump P3. The controller 150 controls the compressor 43 so that a refrigerant circulates through the refrigerant line 40 and the first refrigerant bypass line 100. Furthermore, the controller 150 controls the second valve V2 and the first pump P1 so that cooling water that has passed through the high-voltage battery core B is introduced into the high-voltage battery core B after passing through the first cooling water bypass line 70. Accordingly, the cooling water in the first cooling water bypass line 70 is thermally connected to the first refrigerant bypass line 100 through the battery chiller 90. Therefore, the cooling water in the first cooling water bypass line 70 is cooled by the refrigerant in the first refrigerant bypass line 100. Accordingly, as the cooling water in the first cooling water bypass line 70 is cooled, the high-voltage battery core B is cooled. Furthermore, the controller 150 controls the third valve V3 and the second pump P2 so that the cooling water that has passed through the first radiator R1 is introduced into the first radiator R1 after passing through the introduction line 20, the discharge line 30, and the second cooling water bypass line 80. Accordingly, the cooling water in the introduction line 20 is thermally connected to the refrigerant in the refrigerant line 40 through the water-cooling condenser 50. Therefore, the cooling water in the introduction line 20 increases in temperature by exchanging heat with the refrigerant in the refrigerant line 40, circulates, and is then cooled again through the first radiator R1. That is, heat generated by the high-voltage battery core B transfers to the first refrigerant bypass line 100 through the battery chiller 90. The heat transferring from the high-voltage battery core B transfers to the first radiator R1 through the water-cooling condenser 50 and then dissipated through the first radiator R1. Furthermore, the controller 150 controls the first valve V1 and the third pump P3 so that cooling water circulates through the electric part line 60. Accordingly, the waste heat of the electric part core M is dissipated through the second radiator R2.

According to the thermal management system for a vehicle of the present invention, in a fourth mode in which the electric part core M is cooled using external air outside the vehicle and cooled air is discharged to the interior of the vehicle, the controller 150 controls the compressor 43, the first valve V1, the second valve V2, the third valve V3, the second pump P2, and the third pump P3 so that a refrigerant can circulate through the refrigerant line 40, the cooling water that has passed through the electric part core M may be introduced into the electric part core M after passing through the second radiator R2, and the cooling water that has passed through the first radiator R1 may be introduced into the first radiator R1 after passing through the introduction line 20, the discharge line 30, and the third cooling water bypass line 110.

Figure 4:
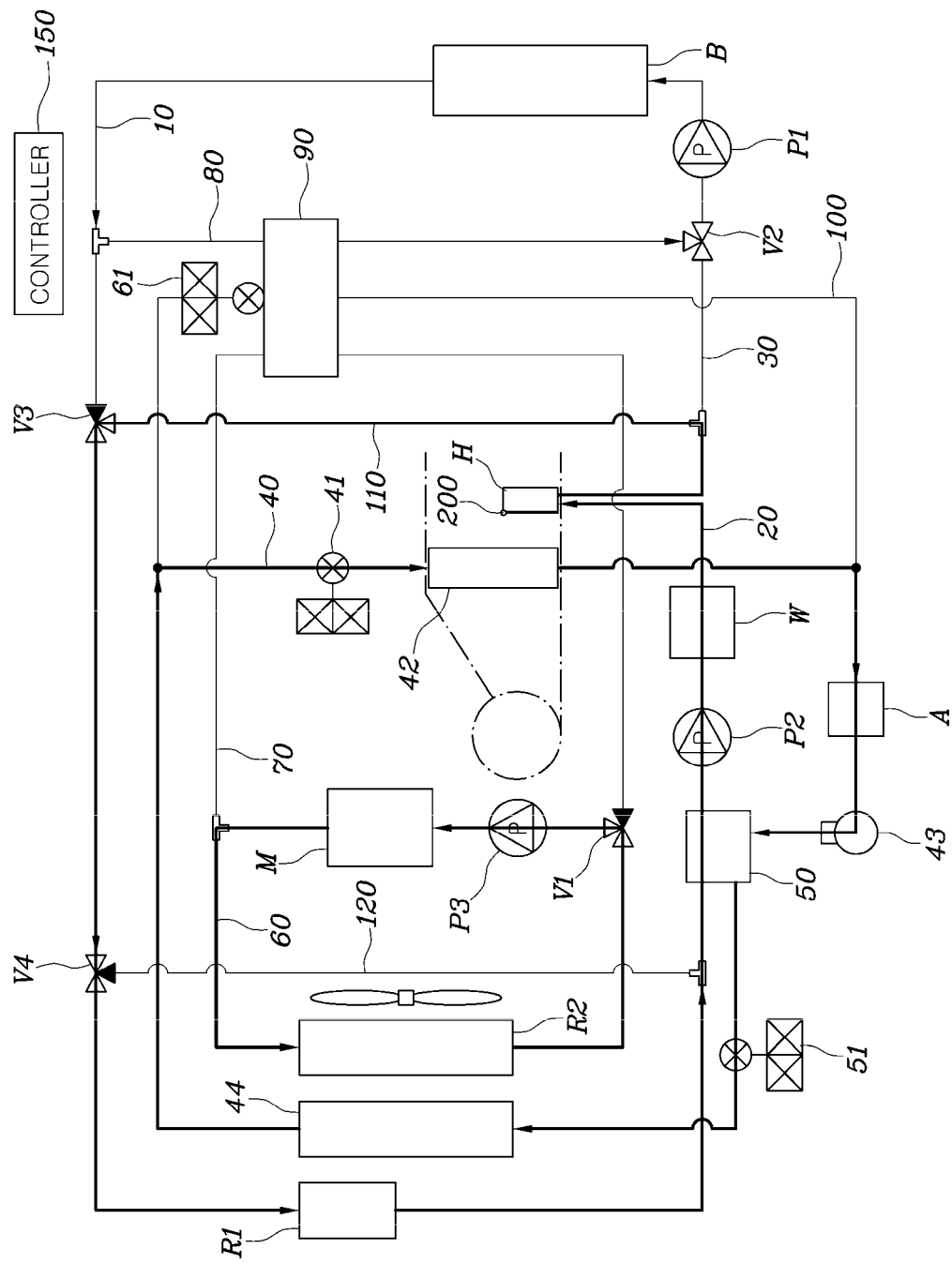

Referring to FIG. 4, the controller 150 controls the compressor 43, the first valve V1, the second valve V2, the third valve V3, the second pump P2, and the third pump P3. The controller 150 controls the compressor 43 so that a refrigerant circulates through the refrigerant line 40. Furthermore, the controller 150 controls the first valve V1 and the third pump P3 so that cooling water circulates through the electric part line 60. Accordingly, the waste heat of the electric part core M is dissipated through the second radiator R2. Furthermore, the controller 150 controls the second valve V2, the third valve V3, and the second pump P2 so that the cooling water that has passed through the first radiator R1 may be introduced into the first radiator R1 after passing through the introduction line 20, the discharge line 30, and the third cooling water bypass line 110. Accordingly, the cooling water in the introduction line 20 increases in temperature by exchanging heat with the refrigerant in the refrigerant line 40 through the water-cooling condenser 50 and then discharges heat through the first radiator R1. Furthermore, the refrigerant in the refrigerant line 40 cools the air flowing through the internal air-conditioning cooling core 42 while circulating, whereby cooled air may be discharged to the interior of the vehicle.

According to the thermal management system for a vehicle of the present invention, in a fifth mode in which the high-voltage battery core B is cooled using the battery chiller 90 and the electric part core M is cooled using external air outside the vehicle, the controller 150 controls the compressor 43, the first valve V1, the second valve V2, the third valve V3, the first pump P1, the second pump P2, and the third pump P3 so that a refrigerant can circulate through a portion of the refrigerant line 40 and the first refrigerant bypass line 100, the cooling water that has passed through the high-voltage battery core B may be introduced into the high-voltage battery core B after passing through the first cooling water bypass line 70, and the cooling water that has passed through the electric part core M may be introduced into the electric part core M after passing through the second radiator R2.

Figure 5:
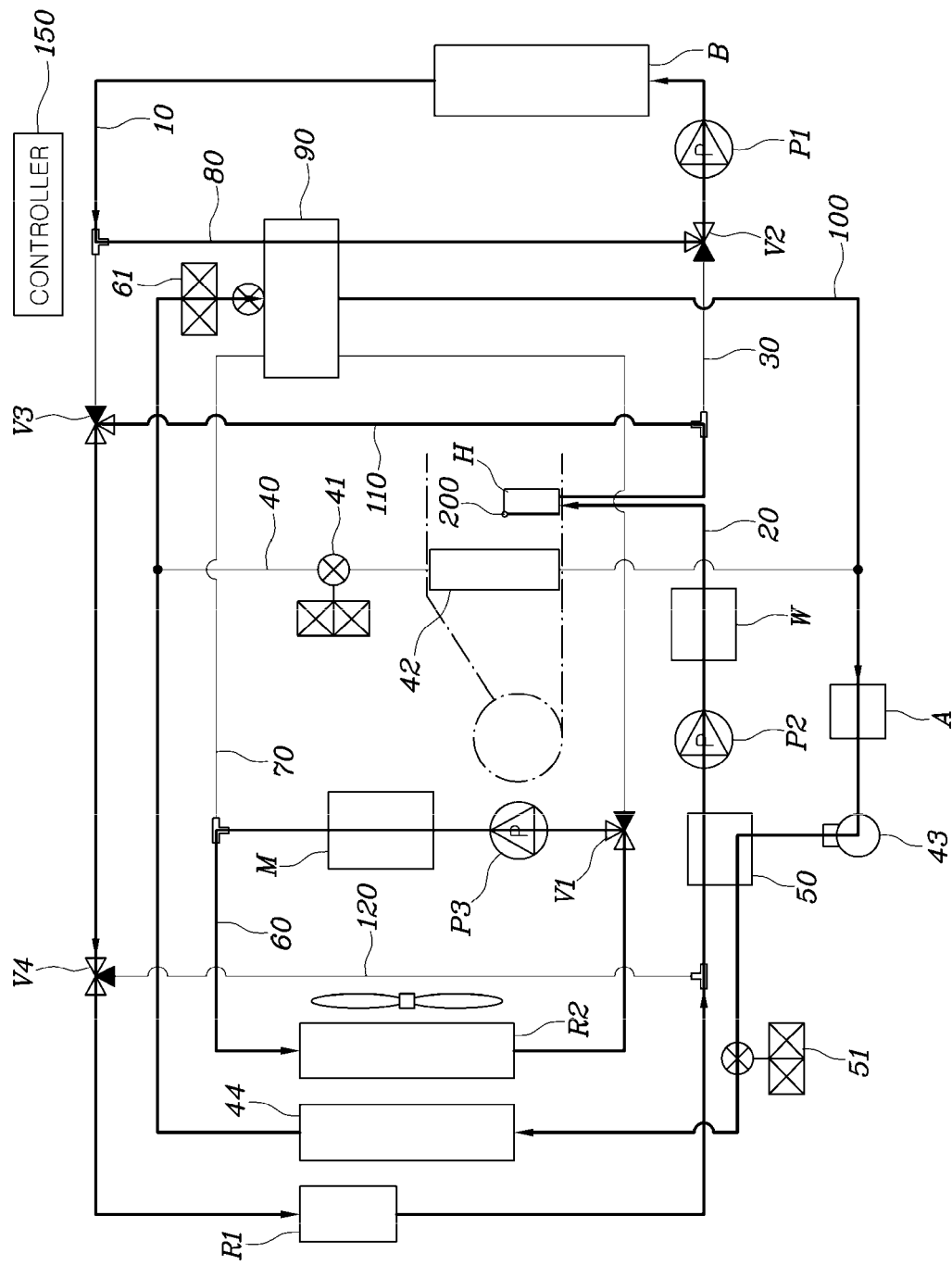

Referring to FIG. 5, the controller 150 controls the compressor 43, the first valve V1, the second valve V2, the third valve V3, the first pump P1, the second pump P2, and the third pump P3. The controller 150 controls the compressor 43 so that a refrigerant circulates through a portion of the refrigerant line 40 and the first refrigerant bypass line 100. Accordingly, the refrigerant that has passed through the compressor 43, the water-cooling condenser 50, and the air-cooling condenser 44 in the refrigerant line 40 passes through the battery chiller 90 through the first refrigerant bypass line 100 and is then introduced back into the compressor 43. Furthermore, the controller 150 controls the second valve V2 and the first pump P1 so that cooling water that has passed through the high-voltage battery core B is introduced into the high-voltage battery core B after passing through the first cooling water bypass line 70. Accordingly, the cooling water in the first cooling water bypass line 70 and the refrigerant in the first refrigerant bypass line 100 are thermally connected, and the refrigerant in the first refrigerant bypass line 100 cools the cooling water in the first cooling water bypass line 70. Therefore, it is possible to cool the high-voltage battery core B using the battery chiller 90. Furthermore, the controller 150 controls the first valve V1 and the third pump P3 so that cooling water that has passed through the electric part core M is introduced into the electric part core M after passing through the second radiator R2. Accordingly, the waste heat of the electric part line 60 is dissipated through the second radiator R2. Furthermore, the controller 150 controls the third valve V3 and the second pump P2 so that the cooling water that has passed through the first radiator R1 is introduced into the first radiator R1 after passing through the introduction line 20, the discharge line 30, and the third cooling water bypass line 110. Accordingly, the cooling water in the introduction line 20 and the refrigerant in the refrigerant line 40 exchange heat with each other through the water-cooling condenser 50, so that the cooling water in the introduction line 20 increases in temperature and the refrigerant in the refrigerant line 40 is further cooled.

Meanwhile, the thermal management system for a vehicle according to an exemplary embodiment of the present invention, as shown in FIG. 1, may further include a fourth cooling water bypass line 120 that has an end portion connected to an upstream side of the first radiator R1 in the battery line 10 through the fourth valve V4 and the other end portion connected to a downstream side of the radiator R1 in the battery line 10.

The fourth cooling water bypass line 120 has an end portion connected to an upstream side of the first radiator R1 in the battery line 10 through the fourth valve V4 and the other end portion connected to a downstream side of the first radiator R1 in the battery line 10. Accordingly, as the fourth valve V4 is controlled by the controller 150, the cooling water in the battery line 10 flows through the fourth cooling water bypass line 120, so cooling water may be prevented from flowing to the first radiator R1. Furthermore, it is possible to make cooling water not flow to the fourth cooling water bypass line 120 and flow to the first radiator R1.

According to the thermal management system for a vehicle of the present invention, in a sixth mode in which the electric part core M and the high-voltage battery core B are cooled using the battery chiller 90 and air with increased temperature is discharged to the interior of the vehicle, the controller 150 controls the compressor 43, the first valve V1, the second valve V2, the third valve V3, the fourth valve V4, the first pump P1, the second pump P2, and the third pump P3 so that a refrigerant can circulate through a portion of the refrigerant line 40 and the first refrigerant bypass line 100, the cooling water that has passed through the electric part core M may be introduced into the electric part core M after passing through the first cooling water bypass line 70, the cooling water that has passed through the high-voltage battery core B may be introduced into the high-voltage battery core B after passing through the second cooling water bypass line 80, and cooling water can circulate through the introduction line 20, the discharge line 30, the third cooling water bypass line 110, and the fourth cooling water bypass line 120.

Figure 6:
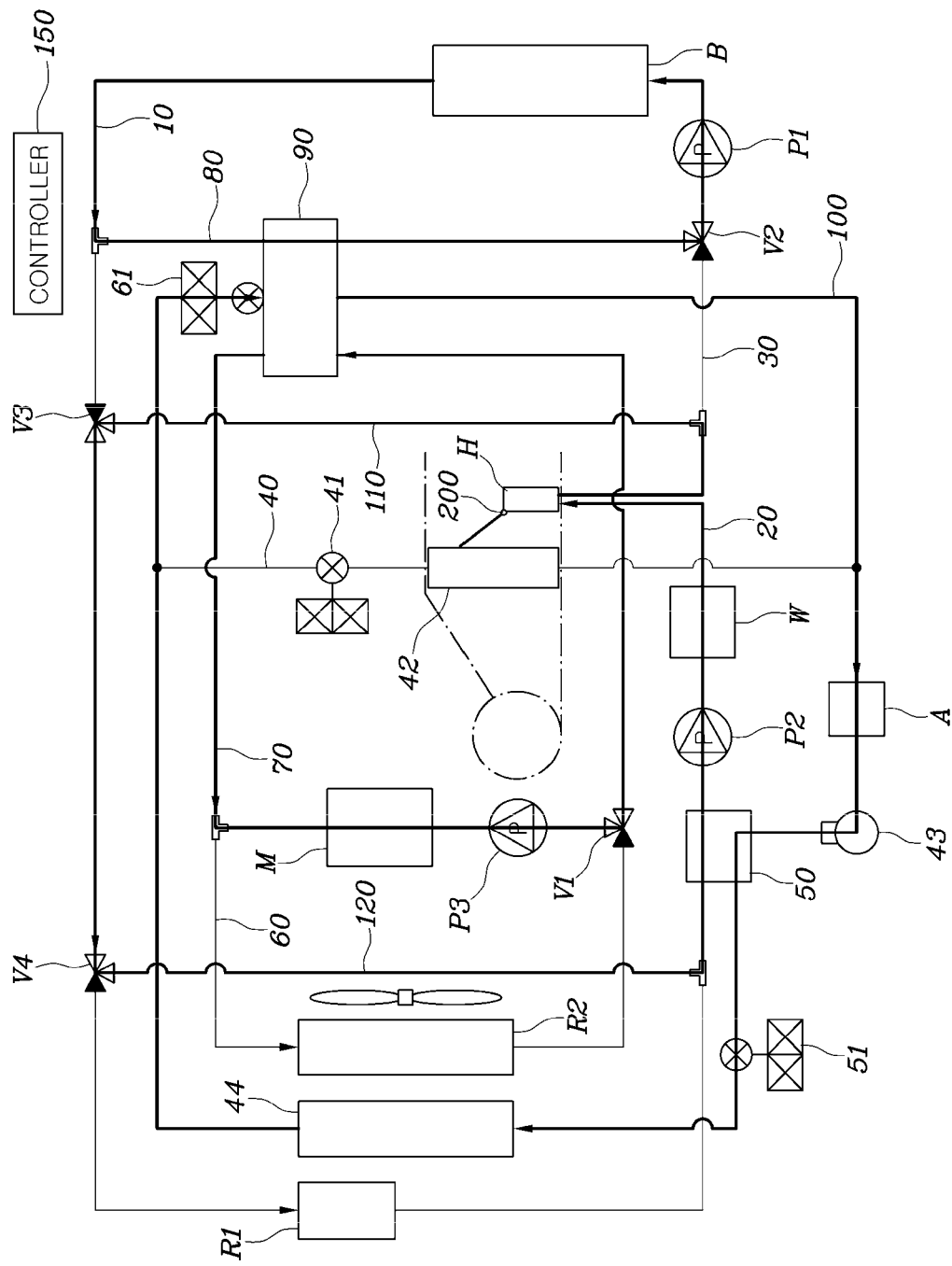

Referring to FIG. 6, the controller 150 controls the compressor 43, the first valve V1, the second valve V2, the third valve V3, the fourth valve, V4, the first pump P1, the second pump P2, and the third pump P3. The controller 150 controls the compressor 43 so that a refrigerant circulates through a portion of the refrigerant line 40 and the first refrigerant bypass line 100. Furthermore, the controller 150 controls the first valve V1 and the third pump P3 so that cooling water that has passed through the electric part core M is introduced into the electric part core M after passing through first cooling water bypass line 70, restoring the waste heat of the electric part core M. Furthermore, the controller 150 controls the second valve V2, the third valve V3, and the first pump P1 so that cooling water that has passed through the high-voltage battery core B is introduced into the high-voltage battery core B after passing through the second cooling water bypass line 80, restoring the waste heat of the high-voltage battery core B. Furthermore, the refrigerant in the first refrigerant bypass line 100 cools the cooling water in the first cooling water bypass line 70 and the cooling water in the second cooling water bypass line 80 through the battery chiller 90. Furthermore, the controller 150 controls the third valve V3, the fourth valve V4, and the second pump P2 so that cooling water can circulate through the introduction line 20, the discharge line 30, the third cooling water bypass line 110, and the fourth cooling water bypass line 120. Accordingly, the cooling water in the introduction line 20 increases in temperature by exchanging heat with the refrigerant in the refrigerant line 40 through the water-cooling condenser 50. The cooling water with increased temperature is introduced into the internal air-conditioning heating core H through the introduction line 20 and increases the temperature of the air flowing through the internal air-conditioning heating core H. Accordingly, it is possible to discharge air with increased temperature to the interior of the vehicle. Furthermore, the cooling water that has passed through the internal air-conditioning heating core H circulates through the discharge line 30, the third cooling water bypass line 110, a portion of the battery line 10, and the fourth cooling water bypass line 120. In the instant case, when the water heater W mounted in the introduction line 20 is used, cooling water further increased in temperature may be introduced into the internal air-conditioning heating core H from the introduction line 20.

According to the thermal management system for a vehicle of the present invention, in a seventh mode in which the high-voltage battery core B is increased in temperature using the water-cooling condenser 50 and air with increased temperature is discharged to the interior of the vehicle, the controller 150 controls the compressor 43, the first valve V1, the second valve V2, the third valve V3, the fourth valve V4, the first pump P1, the second pump P2, and the third pump P3 so that a refrigerant can circulate through a portion of the refrigerant line 40 and the first refrigerant bypass line 100, the cooling water that has passed through the high-voltage battery core B may be introduced into the high-voltage battery core B after passing through the fourth cooling water bypass line 120, the introduction line 20, and the discharge line 30, and the cooling water that has passed through the electric part core M may be introduced into the electric part core M after passing through the first cooling water bypass line 70.

Referring to FIG. 9, the controller 150 controls the compressor 43, the first valve V1, the second valve V2, the third valve V3, the fourth valve, V4, the first pump P1, the second pump P2, and the third pump P3. The controller 150 controls the compressor 43 so that a refrigerant circulates through a portion of the refrigerant line 40 and the first refrigerant bypass line 100. Furthermore, the controller 150 controls the second valve V2, the third valve V3, the fourth valve, V4, the first pump P1, and the second pump P2 so that the cooling water that has passed through the high-voltage battery core B may be introduced into the high-voltage battery core B after passing through the fourth cooling water bypass line 120, the introduction line 20, and the discharge line 30. Accordingly, the cooling water in the introduction line 20 increases in temperature by exchanging heat with the refrigerant in the refrigerant line 40 through the water-cooling condenser 50 and then flows through the internal air-conditioning heating core H. Therefore, the air flowing through the internal air-conditioning heating core H is increased in temperature, so air with increased temperature is discharged to the interior of the vehicle. Furthermore, the controller 150 controls the first valve V1 and the third pump P3 so that cooling water that has passed through the electric part core M is introduced into the electric part core M after passing through the first cooling water bypass line 70. Accordingly, the cooling water that has passed through the electric part core M increases in temperature and then exchanges heat with the refrigerant in the first refrigerant bypass line 100 through the battery chiller 90. Accordingly, there is an advantage in that the waste heat of the electric part core M is used. Furthermore, when a water heater W is used, cooling water further increased in temperature may be introduced into the internal air-conditioning heating core H.

The thermal management system for a vehicle according to various exemplary embodiments of the present invention, as shown in FIG. 10, may further include a fifth cooling water bypass line 130 that has an end portion connected to an upstream side of the water-cooling condenser 50 in the battery line 10 through a fifth valve V5 and the other end portion connected to a downstream side of the water-cooling condenser 50. In the instant case, the controller 150 can control the fifth valve V5 so that cooling water flows to the fifth cooling water bypass line 130, or cooling water flows to the water-cooling condenser 50 without flowing to the fifth cooling water bypass line 130. When cooling water flows to the fifth cooling water bypass line 130, the cooling water dose not flow through the water-cooling condenser 50, so it is possible to prevent cooling water from being increased in temperature by the refrigerant in the refrigerant line 40.

The thermal management system for a vehicle according to various exemplary embodiments of the present invention, as shown in FIG. 11, may further include a second refrigerant bypass line 140 that has an end portion connected to an upstream side of the water-cooling condenser 50 in the refrigerant line 40 and the other end portion connected to a downstream side of the water-cooling condenser 50 through a sixth valve V6.

In the instant case, the controller 150 can control the sixth valve V5 so that a refrigerant flows to the second refrigerant bypass line 140, or a refrigerant flows to the water-cooling condenser 50 without flowing to the second refrigerant bypass line 140. When a refrigerant flows to the second refrigerant bypass line 140, the refrigerant dose not flow through the water-cooling condenser 50, so it is possible to prevent a refrigerant from being condensed by the cooling water in the introduction line 20.

According to the thermal management system for a vehicle according to an exemplary embodiment of the present invention, as shown in FIG. 4, in an eighth mode in which cooled air is discharged to the interior of the vehicle, the controller 150 controls the compressor 43, the second valve V2, the third valve V3, the fourth valve V4, and the second pump P2 so that the refrigerant in the refrigerant line 40 circulates and cooling water circulates through a portion of the battery line 10, the introduction line 20, the discharge line 30, and the third cooling water bypass line 110. In the instant case, the refrigerant in the refrigerant line 40 exchanges heat with the air flowing through the internal air-conditioning cooling core 42, so cooled air is discharged to the interior of the vehicle. Furthermore, the cooling water that has been cooled through the first radiator R1 exchanges heat with the refrigerant in the refrigerant line 40 through the water-cooling condenser 50, so that the refrigerant flowing through the water-cooling condenser 50 in the refrigerant line 40 may be cooled.

According to the thermal management system for a vehicle according to an exemplary embodiment of the present invention, as shown in FIG. 6, in a ninth mode in which air increased in temperature is discharged to the interior of the vehicle, the controller 150 controls the compressor 43, the first valve V1, the second valve V2, the third valve V3, the fourth valve V4, the first pump P1, the second pump P2, and the third pump P3 so that a refrigerant circulates through a portion of the refrigerant line 40 and a refrigerant bypass line, the cooling water that has passed through the third cooling water bypass line 110 is introduced into the internal air-conditioning heating core H after passing through the introduction line 20, the cooling water that has passed through the internal air-conditioning heating core H passes through the fourth cooling water bypass line 120, the cooling water that has passed through the high-voltage battery core B is introduced into the high-voltage battery core B after passing through the second cooling water bypass line 80, and the cooling water that has passed through the electric part core M is introduced into the electric part core M after passing through the first cooling water bypass line 70. In the instant case, the refrigerant in the refrigerant line 40 and the cooling water in the introduction line 20 exchange heat with each other through the water-cooling condenser 50, cooling water with increased temperature is introduced into the internal air-conditioning heating core H. Accordingly, the air passing through the internal air-conditioning heating core H increases in temperature, so air with increased temperature is discharged to the interior of the vehicle. In the instant case, as shown in the figures, the cooling water in the first cooling water bypass line 70 and the second cooling water bypass line 80 exchange heat with the refrigerant in the refrigerant bypass line through the battery chiller 90 so that there is an advantage in that the high-voltage battery core B and the electric part core M can also be cooled.

Figure 7:
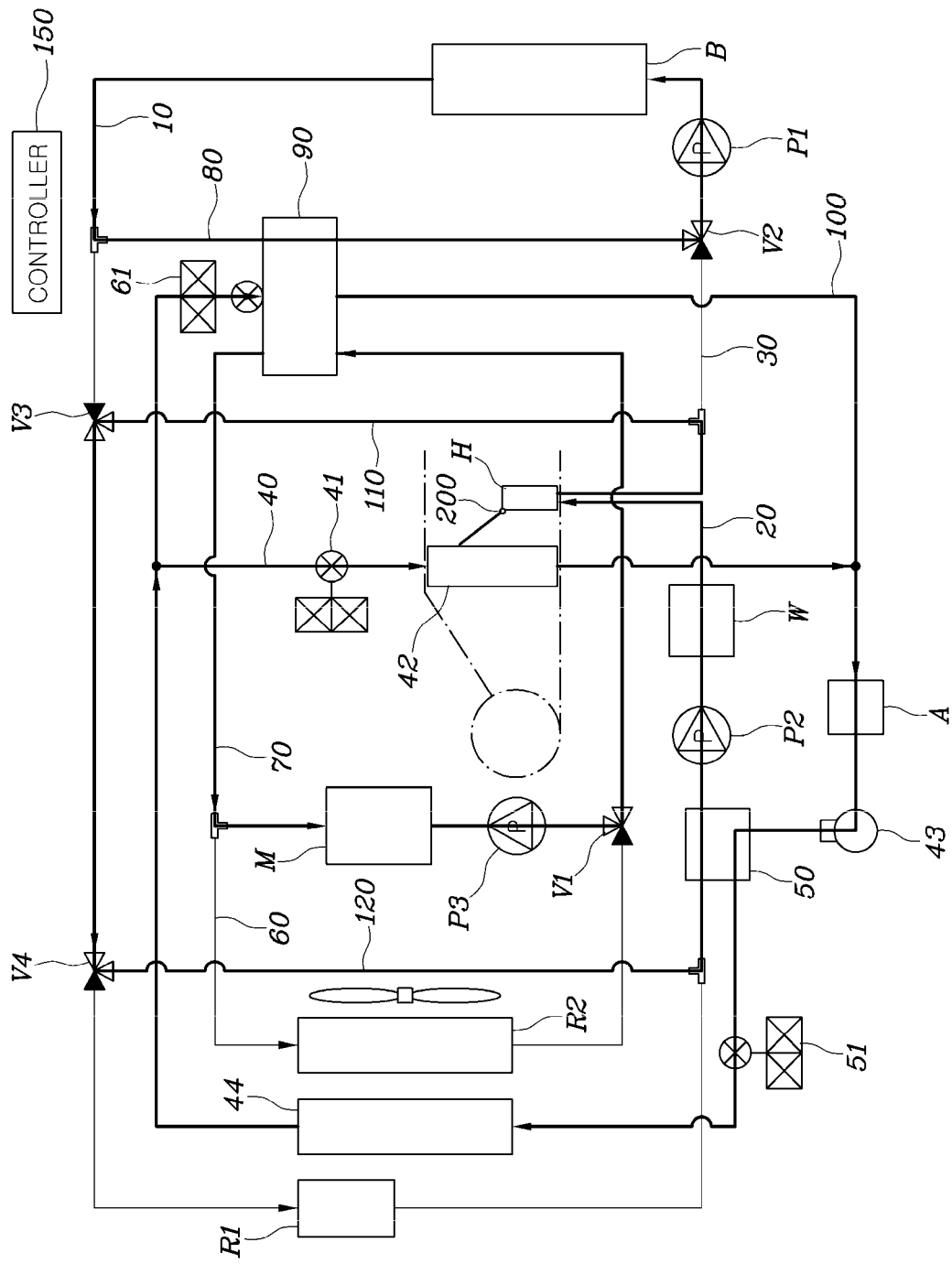

According to the thermal management system for a vehicle according to an exemplary embodiment of the present invention, as shown in FIG. 7, in a tenth mode in which dehumidified air is discharged to the interior of the vehicle, the controller 150 controls the compressor 43, the first valve V1, the second valve V2, the third valve V3, the fourth valve V4, the first pump P1, the second pump P2, and the third pump P3 so that a refrigerant circulates through the refrigerant line 40 and a refrigerant bypass line, the cooling water that has passed through the third cooling water bypass line 110 is introduced into the internal air-conditioning heating core H after passing through the introduction line 20, the cooling water that has passed through the internal air-conditioning heating core H passes through the fourth cooling water bypass line 120, the cooling water that has passed through the high-voltage battery core B is introduced into the high-voltage battery core B after passing through the second cooling water bypass line 80, and the cooling water that has passed through the electric part core M is introduced into the electric part core M after passing through the first cooling water bypass line 70.

The air flowing through the internal air-conditioning cooling core 42 is dehumidified and cooled through heat exchange, and the refrigerant in the refrigerant line 40 and the cooling water in the introduction line 20 exchange heat with each other through the water-cooling condenser 50, so cooling water increased in temperature is introduced into the internal air-conditioning heating core H and the air flowing through the internal air-conditioning heating core H increases in temperature, whereby dehumidified air is discharged to the interior of the vehicle. In the instant case, as shown in the figures, the cooling water in the first cooling water bypass line 70 and the second cooling water bypass line 80 exchange heat with the refrigerant in the refrigerant bypass line through the battery chiller 90, whereby there is an advantage in that the high-voltage battery core B and the electric part core M can also be cooled.

According to the thermal management system for a vehicle according to an exemplary embodiment of the present invention, as shown in FIG. 8, in an eleventh mode in which the high-voltage battery core B is increased in temperature using the water heater W, the controller 150 controls the second valve V2, the third valve V3, the fourth valve V4, the first pump P1, the second pump P2, and the water heater W so that cooling water that has passed through the high-voltage battery core B is circulated to be introduced back into the high-voltage battery core H after passing through the fourth cooling water bypass line 120. In the instant case, the cooling water increased in temperature through the water heater W is introduced into the high-voltage battery core B, the high-voltage battery core B may be increased in temperature.

According to the thermal management system for a vehicle of the present invention, it is possible to efficiently manage energy required for internal air-conditioning, cooling of electric parts, or cooling/heating of a battery in the automotive thermal management field.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A thermal management system for a vehicle, the thermal management system comprising:
    a battery line which is connected to a battery core and has a first radiator, and through which cooling water flows by a first pump;
    an introduction line that has a first end portion connected to an upstream side of the first radiator in the battery line and has a second end portion connected to an internal air-conditioning heating core, and through which cooling water flows by a second pump;
    a discharge line that has a first end portion connected to an upstream side of the battery core in the battery line and has a second end portion connected to the internal air-conditioning heating core, and through which the cooling water introduced through the introduction line flows;
    a refrigerant line that has a first expansion valve, an internal air-conditioning cooling core, a compressor, and an air-cooling condenser and through which a refrigerant flows;
    a water-cooling condenser that connects the refrigerant line and the introduction line and is mounted so that the refrigerant at a downstream side of the compressor in the refrigerant line and the cooling water in the introduction line exchange heat with each other through water-cooling condenser; and
    an electric part line which is connected to an electric part core and has a second radiator and through which cooling water flows by a third pump.

2. The thermal management system of claim 1, further including:
    a first cooling water bypass line that has a first end portion connected to an upstream side of the electric part core in the electric part line through a first valve and a second end portion connected to a downstream side of the electric part core in the electric part line;
    a second cooling water bypass line that has a first end portion connected to an upstream side of the battery core in the battery line through a second valve and a second end portion connected to a downstream side of the battery core in the battery line; and
    a battery chiller which is mounted so that the cooling water in the first cooling water bypass line and the cooling water in the second cooling water bypass line exchange heat with each other through the battery chiller.

3. The thermal management system of claim 2, further including:
    a first refrigerant bypass line that has a first end portion connected to an upstream side of the first expansion valve in the refrigerant line and a second end portion connected to a downstream side of the internal air-conditioning cooling core in the refrigerant line,
    wherein the first refrigerant bypass line is connected to the battery chiller, so that a refrigerant in the first refrigerant bypass line exchanges heat with cooling water in the first cooling water bypass line or cooling water in the second cooling water bypass line through the battery chiller.

4. The thermal management system of claim 3,
    wherein a controller is connected to the compressor, the second valve, the first pump, and the second pump, and
    wherein, in a first mode in which the battery core is cooled using external air outside the vehicle and cooled air is discharged to an interior of the vehicle, the controller is configured to control the compressor, the second valve, the first pump, and the second pump so that a refrigerant circulates through the refrigerant line and cooling water that has passed through the battery core is introduced into the battery core after passing through the first radiator.

5. The thermal management system of claim 3,
    wherein a controller is connected to the compressor, the first valve, the second valve, the first pump, the second pump, and the third pump, and
    wherein, in a second mode in which the battery core and the electric part core are cooled using external air outside the vehicle and cooled air is discharged to the interior of the vehicle, the controller is configured to control the compressor, the first valve, the second valve, the first pump, the second pump, and the third pump so that a refrigerant circulates through the refrigerant line, cooling water that has passed through the battery core is introduced into the battery core after passing through the first radiator, and cooling water that has passed through the electric part core is introduced into the electric part core after passing through the second radiator.

6. The thermal management system of claim 3, further including:
    a third cooling water bypass line that has a first end portion connected to a downstream side of the battery core in the battery line through a third valve and a second end portion connected to the discharge line.

7. The thermal management system of claim 6,
    wherein a controller is connected to the compressor, the first valve, the second valve, third valve, the first pump, the second pump, and the third pump, and
    wherein, in a third mode in which the battery core is cooled using the battery chiller, the electric part core is cooled using external air outside the vehicle, and cooled air is discharged to the interior of the vehicle, the controller is configured to control the compressor, the first valve, the second valve, third valve, the first pump, the second pump, and the third pump so that a refrigerant circulates through the refrigerant line and the first refrigerant bypass line, cooling water that has passed through the battery core is introduced into the battery core after passing through the first cooling water bypass line, the cooling water that has passed through the first radiator is introduced into the first radiator after passing through the introduction line, the discharge line, and the second cooling water bypass line, and cooling water that has passed through the electric part core is introduced into the electric part core after passing through the second radiator.

8. The thermal management system of claim 6, wherein a controller is connected to the compressor, the first valve, the second valve, the third valve, the second pump, and the third pump, and wherein, in a fourth mode in which the electric part core is cooled using external air outside the vehicle and cooled air is discharged to the interior of the vehicle, the controller is configured to control the compressor, the first valve, the second valve, the third valve, the second pump, and the third pump so that a refrigerant circulates through the refrigerant line, cooling water that has passed through the electric part core is introduced into the electric part core after passing through the second radiator, and cooling water that has passed through the first radiator is introduced into the first radiator after passing through the introduction line, the discharge line, and the third cooling water bypass line.

9. The thermal management system of claim 6, wherein a controller is connected to the compressor, the first valve, the second valve, the third valve, the first pump, the second pump, and the third pump, and wherein, in a fifth mode in which the battery core is cooled using the battery chiller and the electric part core is cooled using external air outside the vehicle, the controller is configured to control the compressor, the first valve, the second valve, the third valve, the first pump, the second pump, and the third pump so that a refrigerant circulates through a portion of the refrigerant line and the first refrigerant bypass line, cooling water that has passed through the battery core is introduced into the battery core after passing through the first cooling water bypass line, and cooling water that has passed through the electric part core is introduced into the electric part core after passing through the second radiator.

10. The thermal management system of claim 6, further including:
a fourth cooling water bypass line that has a first end portion connected to an upstream side of the first radiator in the battery line through a fourth valve and a second end portion connected to a downstream side of the radiator in the battery line.

11. The thermal management system of claim 10, wherein a controller is connected to the compressor, the first valve, the second valve, the third valve, the fourth valve, the first pump, the second pump, and the third pump, and
wherein, in a sixth mode in which the electric part core and the battery core are cooled using the battery chiller and air with increased temperature is discharged to the interior of the vehicle, the controller is configured to control the compressor, the first valve, the second valve, the third valve, the fourth valve, the first pump, the second pump, and the third pump so that a refrigerant circulates through a portion of the refrigerant line and the first refrigerant bypass line, cooling water that has passed through the electric part core is introduced into the electric part core after passing through the first cooling water bypass line, cooling water that has passed through the battery core is introduced into the battery core after passing through the second cooling water bypass line, and cooling water circulates through the introduction line, the discharge line, the third cooling water bypass line, and the fourth cooling water bypass line.

12. The thermal management system of claim 10, wherein a controller is connected to the compressor, the first valve, the second valve, the third valve, the fourth valve, the first pump, the second pump, and the third pump, and
wherein, in a seventh mode in which the battery core is increased in temperature using the water-cooling condenser and air with increased temperature is discharged to the interior of the vehicle, the controller is configured to control the compressor, the first valve, the second valve, the third valve, the fourth valve, the first pump, the second pump, and the third pump so that a refrigerant is configured to circulate through a portion of the refrigerant line and the first refrigerant bypass line, cooling water that has passed through the battery core is introduced into the battery core after passing through the fourth cooling water bypass line, the introduction line, and the discharge line, and cooling water that has passed through the electric part core is introduced into the electric part core after passing through the first cooling water bypass line.

13. The thermal management system of claim 10, further including:
a fifth cooling water bypass line that has a first end portion connected to an upstream side of the water-cooling condenser in the battery line through a fifth valve and a second end portion connected to a downstream side of the water-cooling condenser.

14. The thermal management system of claim 10, further including:
a second refrigerant bypass line that has a first end portion connected to an upstream side of the water-cooling condenser in the refrigerant line and a second end portion connected to a downstream side of the water-cooling condenser through a sixth valve.

15. The thermal management system of claim 1, wherein a second expansion valve is mounted between the air-cooling condenser and the water cooling condenser on the refrigerant line.

16. The thermal management system of claim 1, wherein a third expansion valve is mounted between the air-cooling condenser and the battery chiller on a first refrigerant bypass line that has a first end portion connected to an upstream side of the first expansion valve in the refrigerant line and a second end portion connected to a downstream side of the internal air-conditioning cooling core in the refrigerant line.

* * * * *